May 23, 1933.  J. DE LA CIERVA  1,910,520
AIRCRAFT WITH ROTATIVE SUSTAINING BLADES
Original Filed Nov. 1, 1926
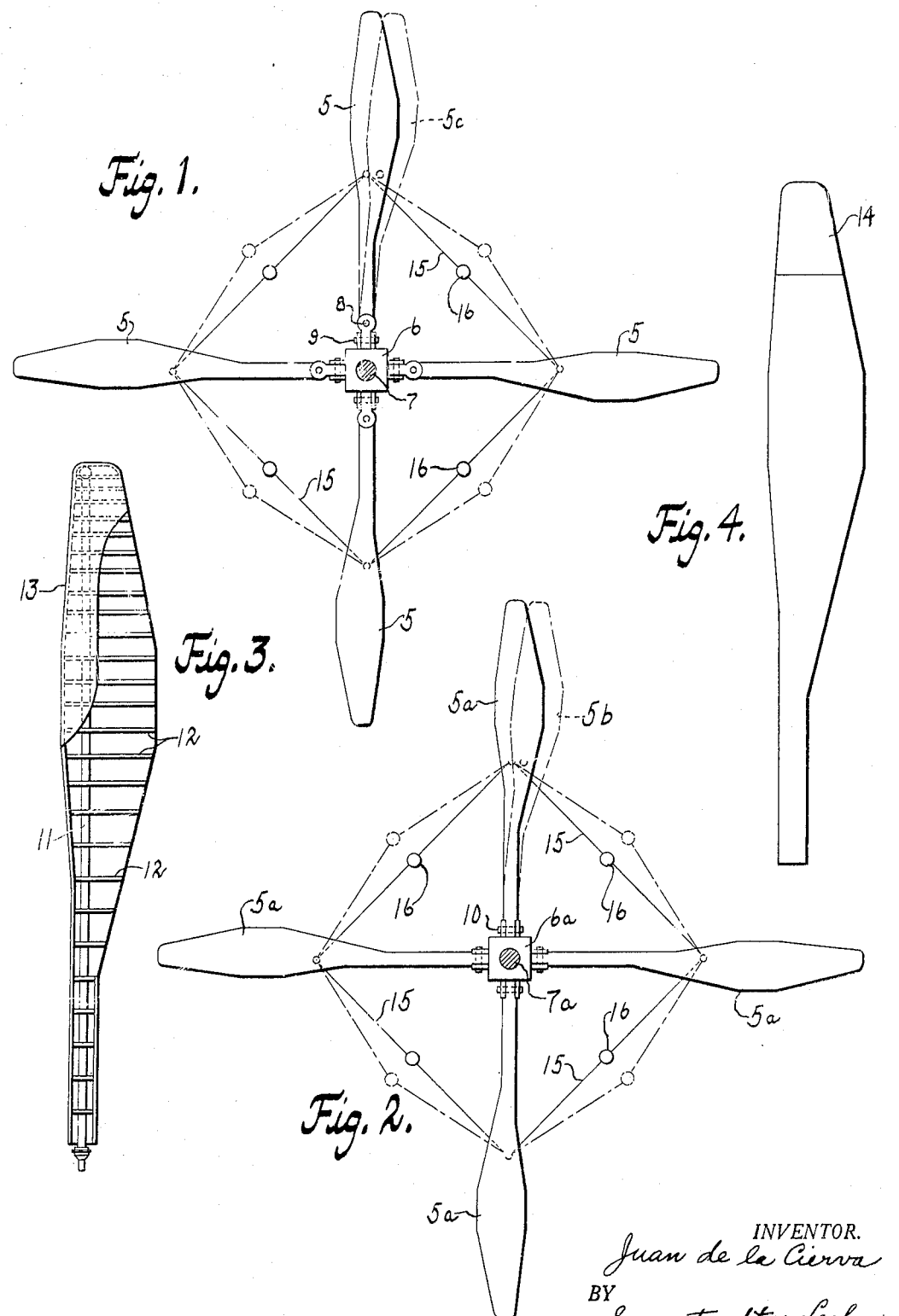
INVENTOR.
Juan de la Cierva
BY
Sjmestvedt + Lechner
ATTORNEYS.

Patented May 23, 1933

1,910,520

UNITED STATES PATENT OFFICE

JUAN DE LA CIERVA, OF MADRID, SPAIN, ASSIGNOR TO AUTOGIRO COMPANY OF AMERICA, OF PHILADELPHIA, PENNSYLVANIA, A CORPORATION OF DELAWARE

AIRCRAFT WITH ROTATIVE SUSTAINING BLADES

Original application filed November 1, 1926, Serial No. 145,655, and in Great Britain November 19, 1925. Divided and this application filed November 26, 1930. Serial No. 498,300.

This invention relates to aircraft with rotative sustaining blades, and is particularly concerned with various features of construction of the blades themselves. The invention, furthermore, is especially useful in connection with aircraft of this general type in which the sustaining blades are mounted for actuation by relative air-flow such as results from movement of the craft through the atmosphere.

This application is a division of my copending application Serial No. 145,655, filed November 1st. 1926.

The general nature, as well as objects and advantages of the present invention can best be understood when bearing in mind various characteristics of craft of this type.

To this end, some of the more important of such characteristics are presented hereinbelow, together with a discussion of the preferable construction and operation of such craft.

In general, the blade or wing system comprises a set of sustaining blades which are mounted for rotation about a common substantially vertically disposed axis, the said set preferably being disposed above the body or fuselage of the craft and mounted on suitable supporting structure which includes means providing for the common rotation referred to.

During actuation of the rotor construction, various different aerodynamical and other forces are applied to the blades, the said forces varying, during forward flight and as to each blade individually, in direction as well as amplitude at various points in each revolution. Among such forces might be mentioned, centrifugal, lift, drag, anti-drag, and the like.

Forces of this character, of course, tend to subject the blades to various bending strains, at least some of which it is desirable to limit or yieldingly resist. To this end, the sustaining blades of such craft ordinarily are flexibly mounted on or connected with a rotatable hub structure so that the blades, in addition to having a common rotative movement, are free to assume various positions, preferably individually and independently of the common rotation thereof, under the influence of forces such as those mentioned above. The flexibility may be provided either by the use of pivot or articulated joints between the blades and the hub structure or by the use of blade members which are flexible themselves, or by a combination of such arrangements.

Furthermore, in rotation of the rotor system, the velocity of each blade, as well as the centrifugal action thereon, increases as the outer end of the blade is approached, with the result that the air pressure thereon is not equally distributed along the blade. The outer portion or neighborhood of the blade tip is, of course, subjected to greater pressure than the inner portion thereof, so that it is desirable to employ blade structures in which the outer portions are of relatively great strength and rigidity to resist such greater pressure. Conversely, the inner portion of each blade need only be made of relatively light construction, and to take advantage of these circumstances the present invention contemplates the use of a blade structure which is relatively light in total weight and which, at the same time, provides sufficient strength and rigidity in the portions where such characteristics are most needed. Still further, with a blade construction which is relatively light as a whole, it may be desirable to augment the action of centrifugal force, preferably at or near the extremity of the wing, so that this centrifugal action is so proportioned, with respect to the lift afforded by the blade, as to maintain the blade in an efficient position.

At the same time, the present invention contemplates the construction of sustaining blades of the character here involved which provide relatively great flexibility at the inner portions thereof, with the result that such flexibility serves, at least in part, to permit the blades, individually, to assume various positions under the influence of the various as well as varying forces to which they are subjected.

More specifically, the present invention has in view the construction of a blade structure including ribbing therein arranged in such manner as to provide relatively great flexibility at the inner portion thereof, relatively great rigidity or strength in the outer portion thereof and/or relatively greater weight in such outer portion.

A further feature of the invention is involved in the use of means, preferably applied externally of the blade and in the outer portion thereof, to provide additional strength and/or weight.

How the foregoing, together with other objects and advantages are obtained will be apparent from a consideration of the accompanying drawing, in which—

Figure 1 is a somewhat diagrammatic plan view of a rotor construction or blade system including the improvements of the present invention;

Figure 2 is a view similar to Figure 1 but illustrating the application of the structure of the present invention to a blade system having a somewhat different type of mounting structure for the individual blades;

Figure 3 is a plan view of a blade constructed in accordance with the present invention, with certain parts thereof, such as the blade covering, omitted in order to disclose elements disposed within the blade; and Figure 4 is a plan view of a blade illustrating a modified application of certain features of this invention.

Referring to Figure 1 particularly, the sustaining rotor construction includes a set of blades 5 which are carried by or secured to the hub member or structure 6, the latter being mounted for rotation on the supporting shaft or standard 7. The relative rotation provided between the members 6 and 7, of course, affords the rotation of the set of blades about a common axis, and in order to provide for individual displacement of the blades, the structure of Figure 1 includes a plurality of pivot joints such as those indicated at 8 and 9, it being noted that the joints 8 permit movements of the blades on substantially vertically disposed axes while the pivot joints 9 permit movements of the blades on substantially horizontally disposed axes. In this connection, it should be noted that the flexible blade construction, hereinbefore referred to and more particularly described below, may be employed in combination with pivot means such as those indicated at 8 and 9 in order to provide for individual displacement of the blades under the influence of various of the aerodynamic and other forces to which they are subjected. In Figure 1, a blade displacement or movement on the pivot axis 8 is indicated at 5c.

The structure of Figure 2, in a similar manner, includes a set of blades 5a associated with the hub structure 6a, the said hub structure being mounted for rotation on the shaft 7a. In this figure, however, the blades 5a are illustrated as being pivotally secured to the hub 6a only on a substantially horizontally disposed pivot means 10. In this instance, individual displacement or movement of each blade in the general path of travel thereof is entirely taken care of by a certain flexibility of the blade structure, more fully referred to hereinbelow. A flexure or displacement of this character, however, is illustrated in Figure 2 at 5b. In both of the rotor constructions illustrated, blade interconnections, which may take the form of suitable cables 15 and weights 16, are preferably provided in order to yieldingly resist certain of the individual blade movements such, for example, as those noted above, the action of such blade interconnections being fully set forth in my copending application above referred to, as well as in my copending application Serial No. 498,298, filed November 26, 1930.

A flexible blade structure such as may be employed in the arrangements of Figures 1 and 2 is illustrated in Figure 3, and by reference to this figure it will be seen that such a blade may be made up or built on a main spar or beam 11 extending longitudinally thereof. The internal construction of this blade, furthermore, includes a plurality of ribs 12 which are structurally associated with the support 11 and which, as clearly illustrated, are spaced from each other different distances in different portions of the blade. In this instance, the spacing is progressively decreased from the inner to the outer end of the blade, although it is to be understood that the ribbing may be arranged in other ways in order to produce the same or similar results. Among the results, in this instance, are the increased rigidity and strength of the blade structure as its outer end is approached with the greatest strength at the tip and the greatest flexibility at an inner portion. Additionally, this structure provides for relatively greater weight or mass in the outer portion of the blade so that the effect of centrifugal force on the blade is greatest in this region, and also in order that the action of centrifugal force may be sufficiently great without unduly increasing the total weight of the blade.

Still further, if desired, the outer portion of the blade may also be strengthened and/or weighted by the use of a relatively rigid and/or heavy covering or sheathing such as indicated at 13.

An alternative or modified form of such covering is illustrated in Figure 4. In this case, such a covering takes the form of a relatively short cap or tip portion covering the outer end of the blade, as indicated by the reference numeral 14, which, if desired, may be of a relatively heavy construction in order to sufficiently augment the action of centrifugal force. In connection with both Figures 3 and 4, it should be noted that the covering or sheathing may be composed of metal sheeting, suitable ply-wood or any other material which will serve the intended purpose.

In considering the operation of the structure herein disclosed, it should be noted that the blade structure of the present invention may be employed either with or without various blade articulations at the hub in order to provide the desirable flexibility so that the blades may be free to assume various positions independently of each other under the influence of the forces to which they are subjected.

In general, therefore, the improvements involved in the present invention materially enhance the construction and operation of craft of this character by increasing smoothness of operation of the rotor construction as well as by providing a desirable degree of strength and flexibility in the portion of each individual blade in which such qualities are most needed. Furthermore, it will be apparent that the present invention accomplishes the foregoing objects and advantages by the use of a structure which is simple, durable and rugged, and which may be so arranged as to automatically assume the most efficient curvature or angle of attack during operation.

I claim:

1. In an aerial device, a sustaining rotor including blades mounted about a common axis and arranged so that relative air-flow may be permitted to rotate them, and means whereby said blades may be displaced, during rotation, to assume at all times a position of equilibrium between different aerodynamic and other forces acting thereon, such means including flexible structure in the blades themselves and means of flexible attachment to the common axis of rotation, comprising vertically disposed pivot means.

2. In an aerial device, a sustaining rotor including blades mounted about a common axis and arranged so that relative air-flow may be permitted to rotate them, and means whereby said blades may be displaced, during rotation, to assume at all times a position of equilibrium between different aerodynamic and other forces acting thereon, such means including flexible structure in the blades themselves and means of flexible attachment to the common axis of rotation, comprising vertically and horizontally disposed pivot means.

3. For an aircraft having its ordinary means of propulsion, an independent sustaining system comprising a hub structure mounted for normally free rotation about an upright axis, a plurality of rotative wings including at least two opposed wings of substantially elongated and aeroform shape positioned for autorotation by relative air-flow and pivoted on said hub structure for free and automatic variation in aerodynamical angle of attack whereby differential lift is obviated, and stiffening means forming part of the wings themselves and so distributed that the wings are capable of greater flexure in one zone than in another, whereby in any pivotal position of the wings they individually by flexure may accommodate themselves to the variable forces tending to bend them, while at the same time they are rigid enough to sustain their aeroform shape as against the heavy air pressures encountered.

4. For an aircraft having its ordinary means of propulsion, an independent sustaining system comprising a hub structure mounted for normally free rotation about an upright axis, a plurality of rotative wings of substantially elongated and aeroform shape each positioned for autorotation by relative air-flow and each individually pivoted on said hub structure for free and automatic variation in aerodynamical angle of attack whereby differential lift is obviated, and stiffening means for each wing formed as a part thereof and so distributed in the wing that the same is capable of greater flexure in one zone than in another, whereby in any pivotal position of the individual wing said wing may by flexure in its zone of lesser stiffness accommodate itself to bending forces variably acting thereon throughout its circle of rotation, while at the same time the wing is rigid enough to sustain its aeroform shape as against the heavy air pressures encountered.

5. For an aurorotative sustaining rotor, an aerodynamically-actuable wing of long and narrow plan form having its basic structure in the form of a single, main, longitudinal spar arranged to be subjected, in flight, only to such loads as are imposed by the actuation of the wing by relative air-flow, a pivotal mounting at the root end of said spar, and an aeroform body structure constructed about said spar whereby the wing at its root end delivers its autorotational lift to the craft primarily through said single main spar and its pivotal mounting.

6. For an autorotative sustaining rotor, an aerodynamically-actuable wing of long and narrow plan form having its basic structure in the form of a single, main, longitudinal spar arranged to be subjected, in flight, only to such loads as are imposed by the actuation of the wing by relative air-flow, a pivotal mounting at the root end of said spar, and an aeroform body structure constructed about said spar whereby the wing at its root end delivers its autorotational lift to the craft primarily through said single main spar and its pivotal mounting, and stiffening means extending lengthwise of the wing between the nose of the wing and said main spar thereof.

7. For an autorotative sustaining rotor, an aerodynamically-actuable wing of long and narrow plan form comprising a single, main, longitudinal spar arranged to be subjected, in flight, only to such loads as are imposed by the actuation of the wing by relative air-flow, transverse ribbing mounted upon said spar and carried thereby as against the centrifugal force of rotation, covering material forming the aeroform contour of the wing and carried by said ribbing, and a free pivotal mounting for securing said wing on its axis and connected to carry all the autorotational flight-loads through the root end of said main spar.

8. For an autorotative sustaining rotor, an aerodynamically-actuable wing of long and narrow plan form comprising a single, main, longitudinal spar arranged to be subjected, in flight, only to such loads as are imposed by the actuation of the wing by relative air-flow, transverse ribbing mounted upon said spar and carried thereby as against the centrifugal force of rotation, covering material forming the aeroform contour of the wing and carried by said ribbing, and a free pivotal mounting for securing said wing on its axis and connected to carry all the autorotational flight-loads through the root end of said main spar, said ribbing being arranged to provide greater stiffness, per unit of wing length, in the outer region of the wing, and said wing covering including a stiff plating portion cooperating with the ribbing in said region to increase the resistance of the wing to bending.

9. For an autorotative sustaining rotor, an aerodynamically-actuable wing of very long and narrow plan form comprising one basic longitudinal tubular spar, a freely pivotal mounting device at the root end thereof, a series of transverse ribs secured at intervals to said spar along its length, and means covering the ribs to form the external contour of the wing, including a stiff sheet covering over the nose of the wing and extending back at least to the spar.

In testimony whereof I have hereunto signed my name.

JUAN de la CIERVA.